(12) United States Patent
Criminisi et al.

(10) Patent No.: US 8,437,570 B2
(45) Date of Patent: May 7, 2013

(54) GEODESIC IMAGE AND VIDEO PROCESSING

(75) Inventors: Antonio Criminisi, Cambridge (GB); Toby Sharp, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 12/126,302

(22) Filed: May 23, 2008

(65) Prior Publication Data

US 2009/0290795 A1    Nov. 26, 2009

(51) Int. Cl.
G06K 9/42 (2006.01)
G06K 9/44 (2006.01)
G06K 9/40 (2006.01)

(52) U.S. Cl.
USPC .............................. 382/257; 382/260; 382/173

(58) Field of Classification Search .................. 382/173, 382/257, 258, 260
See application file for complete search history.

(56) References Cited

U.S. PATENT DOCUMENTS

| | | | |
|---|---|---|---|
| 6,298,145 B1 * | 10/2001 | Zhang et al. ................... | 382/103 |
| 6,694,057 B1 | 2/2004 | Miller et al. | |
| 6,771,834 B1 * | 8/2004 | Martins et al. ................. | 382/257 |
| 6,801,661 B1 * | 10/2004 | Sotak et al. .................... | 382/203 |
| 6,902,935 B2 * | 6/2005 | Kaufman et al. ............... | 436/63 |
| 7,239,719 B2 | 7/2007 | Bongiovanni et al. | |
| 7,265,752 B2 | 9/2007 | Sander et al. | |
| 7,274,810 B2 * | 9/2007 | Reeves et al. .................. | 382/128 |
| 7,471,848 B2 | 12/2008 | Fujimoto et al. | |
| 7,773,791 B2 | 8/2010 | Simon et al. | |
| 2002/0094112 A1 | 7/2002 | Makram-Ebeid | |
| 2002/0150305 A1 * | 10/2002 | Gil et al. ........................ | 382/260 |
| 2003/0011596 A1 | 1/2003 | Zhang et al. | |
| 2003/0044061 A1 * | 3/2003 | Prempraneerach et al. .. | 382/164 |
| 2003/0123072 A1 | 7/2003 | Spronk | |
| 2003/0144585 A1 * | 7/2003 | Kaufman et al. ............. | 600/407 |
| 2003/0161516 A1 * | 8/2003 | Vuylsteke ...................... | 382/128 |
| 2003/0161518 A1 * | 8/2003 | Vuylsteke ...................... | 382/128 |
| 2003/0161519 A1 * | 8/2003 | Vuylsteke ...................... | 382/128 |
| 2005/0128211 A1 | 6/2005 | Berger et al. | |
| 2005/0163358 A1 | 7/2005 | Moeller | |
| 2006/0002615 A1 * | 1/2006 | Fu et al. ......................... | 382/254 |
| 2006/0245645 A1 | 11/2006 | Yatziv et al. | |
| 2006/0251298 A1 | 11/2006 | Bronstein et al. | |

(Continued)

FOREIGN PATENT DOCUMENTS

WO    WO2008012808 A2    1/2008

OTHER PUBLICATIONS

Agarwala, et al, "Interactive Digital Photomontage", ACM SIGGRAPH, 2004, pp. 1-9.

(Continued)

Primary Examiner — John Strege
(74) Attorney, Agent, or Firm — Zete Law, P.L.L.C.; MacLane C. Key

(57) ABSTRACT

A method of geodesic image and video processing is proposed. In an embodiment, the method uses a geodesic distance transform to construct an image filter. The filter can be used in a variety of image editing operations such as segmentation, denoising, texture smoothing, image stitching and cartooning. In one embodiment, the method may be made efficient by utilizing parallelism of the algorithm to carry out processing steps on at least two processing cores concurrently. This efficiency may enable high-resolution images and video to be processed at 'real time' rates without the need for specialist hardware.

20 Claims, 8 Drawing Sheets

U.S. PATENT DOCUMENTS

| | | | |
|---|---|---|---|
| 2006/0251324 A1 | 11/2006 | Bachmann et al. | |
| 2007/0014462 A1 | 1/2007 | Rousson et al. | |
| 2007/0025616 A1 | 2/2007 | Grady et al. | |
| 2007/0031037 A1 | 2/2007 | Blake et al. | |
| 2007/0237421 A1 | 10/2007 | Luo et al. | |
| 2008/0002873 A1* | 1/2008 | Reeves et al. | 382/133 |
| 2008/0033897 A1 | 2/2008 | Lloyd | |
| 2008/0044104 A1 | 2/2008 | Gering | |
| 2008/0069445 A1 | 3/2008 | Weber | |
| 2008/0075361 A1* | 3/2008 | Winn et al. | 382/155 |
| 2008/0181503 A1 | 7/2008 | Schclar et al. | |
| 2009/0010565 A1* | 1/2009 | Hsieh et al. | 382/275 |

OTHER PUBLICATIONS

Bai, et al, "A Geodesic Framework for Fast Interactive Image and Video Segmentation and Matting", retrieved at <<http://www.ieeexplore.ieee.org/iel5/4408818/4408819/04408931.pdf?tp=&isnumber=4408819&arnumber=4408931>>, IEEE, 2007, pp. 1-8.

Blake, et al, "Interactive Image Segmentation using an Adaptive GMMRF Model", retrieved at <<http://research.microsoft.com/vision/cambridge/papers/Blake_ECCV04.pdf>>, pp. 1-14.

Borgefors, "Distance Transformations in Digital Images", Computer Vision, Graphics and Image Processing, vol. 34, 1986, pp. 344-371.

Bosseau, et al, "Video Watercolorization using Bidirectional Texture Advection", ACM SIGGRAPH, 2007, pp. 1-7.

Boykov, et al, "An Experimental Comparison of Min-Cut/Max-Flow Algorithms for Energy Minimization in Vision", retrieved at <<http://www.csd.uwo.ca/~yuri/Papers/pami04.pdf>>, IEEE Transactions on PAMI, vol. 26, No. 9, Sep. 2004, pp. 1124-1137.

Boykov, et al, "Fast Approximate Energy Minimization via Graph Cuts", retrieved at <<http://www.soe.ucsc.edu/classes/cmpe290v/Spring05/graphcut.pdf>>, Computer Science Department Cornell University, pp. 1-8.

Boykov, et al, "Interactive Graph Cuts for Optimal Boundary & Region Segmentation of Objects in N-D Images", retrieved at <<http://www.csd.uwo.ca/~yuri/Papers/iccv01.pdf>>, Proceedings of Internation Conference on Computer Vision, vol. I, Jul. 2001, pp. 105-112.

Chen, et al, "Real-time Edge-Aware Image Processing with the Bilateral Grid", ACM Siggraph, 2007, pp. 1-9.

Criminisi, et al, "Bilayer Segmentation of Live Video", retrieved at <<http://www.adastral.ucl.ac.uk/~vladkolm/papers/CCBK-CVPR06.pdf>>, pp. 1-8.

Falcao, et al, "The Image Foresting Transform: Theory, Algorithms, and Applications", IEEE Transactions on Pattern Analysis and Machine Intelligence, vol. 26, No. 1, Jan. 2004, pp. 19-29.

Felsberg, et al, "Channel Smoothing: Efficient Robust Smoothing of Low-Level Signal Features", IEEE Transactions on Pattern Analysis and Machine Intelligence, vol. 28, No. 2, Feb. 2006, pp. 209-222.

Juan, et al, "Active Graph Cuts", retrieved at <<http://ieeexplore.ieee.org/iel5/10924/34373/01640863.pdf?tp=&isnumber=34373&arnumber=1640863>>, IEEE, 2006, pp. 1-7.

Kohli, et al, "Dynamic Graph Cuts for Efficient Interference in Markov Random Fields", retrieved at <<http://ieeexplore.ieee.org/iel5/34/4375367/04359296.pdf?tp=&isnumber=4375367&arnumber=4359296>>, IEEE Transactions on Pattern Analysis and Machine Intelligence, vol. 29, No. 12, Dec. 2007, pp. 2079-2088.

Kolmogorov, et al, "Applications of Parametric Maxflow in Computer Vision", retrieved at <<http://research.microsoft.com/~carrot/publications_files/ParaMaxFlow_iccv07.pdf>>, pp. 1-8.

Kolmogorov, et al, "Bi-layer Segmentation of Binocular Stereo Video", IEEE CVPR, 2005, pp. 1-8.

Kolmogorov, et al, "Multi-Camera Scene Reconstruction via Graph Curts", retrieved at <<http://www.cs.cornell.edu/rdz/Papers/KZ-ECCV02-recon.pdf>>, pp. 1-16.

Kolmogorov, et al, "What Energy Functions Can Be Minimized via Graph Cuts?", retrieved at <<http://www,cs.cornell.edu/~rdz/Papers/KZ-PAMI04.pdf>>, IEEE Transactions on Pattern Analysis and Machine Intelligence, vol. 26, No. 2, Feb. 2004, pp. 147-159.

Komodakis, et al, "Fast, Approximately Optimal Solutions for Single and Dynamic MRF's", retrieved at <<http://www.csd.uoc.gr/~komod/publications/docs/CVPR07_FastPD.pdf>>, pp. 1-8.

Kopf, et al, "Joint Bilateral Upsampling", ACM Transactions on Graphics (Proceedings of Siggraph 2007), vol. 26, No. 3, 2007, pp. 1-5.

Lempitsky, et al, "LogCut—Efficient Graph Cut Optimization for Markov Random Fields", retrieved at <<http://research.microsoft.com/~victlem/logcut.pdf>>, pp. 1-8.

Lombaert, et al, "A Multilevel Banded Graph Cuts Method for Fast Image Segmentation", IEEE ICCV, 2005, pp. 1-7.

"Maxflow", retrieved Aug. 27, 2008 at <<http://www.adastral.ucl.ac.uk/~vladkolm/software.html>>, Software, pp. 1-2.

Mortensen, et al, "Intelligent Scissors for Image Composition", ACM Siggraph, 1995, pp. 1-8.

Paragios, et al, "Geodesic Active Contours and Level Sets for the Detection and Tracking of Moving Objects", retrieved at <<http://meip6sb.alab.t.u-tokyo.ac.jp/~shino/scanned_paper/00_01/GeodesicActiveContours.pdf>>, IEEE, vol. 22, No. 3, Mar. 2000, pp. 266-280.

Perona, et al, "Scale-Space and Edge Detection Using Anisotropic Diffusion", IEEE Transactions on Pattern Analysis and Machine Intelligence, vol. 12, No. 7, Jul. 1990, pp. 629-639.

Pham, et al, "Separable Bilateral Filtering for Fast Video Preprocessing", IEEE International Conference on Multimedia and Expo, 2005, pp. 1-4.

Rother, "'GrabCut'—Interactive Foreground Extraction using iterated Graph Cuts", retrieved at <<http://research.microsoft.com/vision/cambridge/papers/siggraph04.pdf>>, Microsoft Research, pp. 1-6.

Rother, et al, "Cosegmentation of Image Pairs by Histogram Matching—Incorporating a Global Constraint into MRFs", retrieved at <<http://research.microsoft.com/vision/cambridge/papers/carrot_CVPR06.pdf>>, Microsoft, pp. 1-8.

Rother, "Optimizing Binary MRFs via Extended Roof Duality", IEEE CVPR, 2007, pp. 1-8.

Sinop, et al, "A Seeded Image Segmentation Framework Unifying Graph Cuts and Random Walker Which Yields a New Algorithm", retrieved at <<http://www.ieeexplore.ieee.org/iel5/4408818/4408818/4408819/04408927.pdf?tp&isnumber=4408819&arnumber=4408927>>, IEEE, 2007, pp. 1-8.

Szeliski, et al, "A Comparative Study of Energy Minimization Methods for Markov Random Fields", retrieved at <<http://www.wisdom.weizmann.ac.il/~mica/CVspring06/papers/optimization_1/Zabih%20comparative%20study.pdf>>, Microsoft Research, pp. 1-17.

Toivanen, "New Geodesic Distance Transforms for Gray-Scale Images", Pattern Recognition Letters 17, 1996, pp. 437-450.

Tomasi, et al, "Bilateral Filtering for Gray and Color Images", Proceedings of the 1998 IEEE International Conference on Computer Vision, 1998, pp.

Veksler, "Efficient Graph-Based Energy Minimization Methods in Computer Vision", retrieved at <<http://citeseer.ist.psu.edu/cache/papers/cs/24543/http:zSzzSzwww.neci.nj.nec.comzSzhomepageszSzolgazSzthesis.pdf/veksler99efficient.pdf>>, A Dissertation Presented to the Faculty of the Graduate School of Cornell University in partial Fulfillment of the Requirements for the Degree of Doctor of Philosophy, Aug. 1999, pp. i-ix, 1-90.

Wang, et al, "Video Tooning", ACM Siggraph, 2004, pp. 1-10.

Weiss, et al, "Fast Median and Bilateral Filtering", ACM Siggraph, 2006, pp. 519-526.

"Welcome to UCL's Adastral Park Postgraduate Research Teaching Campus", retrieved Feb. 28, 2008 at <<http://www.adastral.ucl.ac.uk/>>, Adastral Park Postgraduate Research Campus, 2008, pp. 1-2.

Winnemoller, et al, "Real-Time Video Abstraction", ACM Siggraph, 2006, pp. 1-6.

Yatziv, et al, "Fast Image and Video Colorization Using Chrominance Blending", IEEE Transactions of Image Processing, vol. 15, No. 5, May 2006, pp. 1120-1129.

Yatziv, et al, "O(N) Implementation of the Fast Marching Algorithm", Journal of Computational Physics 212, 2006, pp. 1-8.

Zitnick, et al, "High-Quality Video View Interpolation Using a Layered Representation", retrieved at <<http://www.cs.ucl.ac.uk/staff/s.prince/4C75/ZitnickSig04.pdf>>, Interactive Visual Media Group, Microsoft Research, pp. 1-9.

Avidan, et al., "Seam Carving for Content-Aware Image Resizing", retrieved on Feb. 17, 2009 at <<http://www.shaiavidan.org/papers/imretFinal.pdf>>, 9 pages.

Bendels, et al., "Image and 3D-Object Editing with Precisely Specified Editing Regions", retrieved on Feb. 17, 2009 at <<http://citeseerx.ist.psu.edu/viewdoc/download;jsessionid=ADCBF6715209FA8B6286AF79A9B6C006?doi=10.1.1.2.9816&rep=rep1&type=pdf>>, VMV, 2003, 9 pages.

Breu, et al., "Linear Time Euclidean Distance Transform Algorithms", retrieved on Feb. 17, 2009 at <<http://ieeexplore.ieee.org/stamp/stamp.jsp?arnumber=391389&isnumber=8868>>, IEEE Transactions on Pattern Analysis and Machine Intelligence, vol. 17, No. 5, May 1995, pp. 529-533.

Bronstein, et al., "Parallel algorithms for approximation of distance maps on parametric surfaces" retrieved on Feb. 17, 2009 at <<http://www.cs.technion.ac.il/users/wwwb/cgi-bin/tr-get.cgi/2007/CIS/CIS-2007-03.pdf>>, Computer Science Department—Technical Report, Technion, 2007, pp. 1-22.

Brown, et al., "Multi-Image Matching using Multi-Scale Oriented Patches", retrieved on Feb. 17, 2009 at <<http://graphics.cs.cmu.edu/courses/15-463/2007_fall/Papers/MOPS.pdf>>, 8 pages.

Buades, et al., "A non-local algorithm for image denoising", retrieved Feb. 17, 2009 at <<http://ieeexplore.ieee.org/stamp/stamp.jsp?arnumber=01467423>>, 6 pages.

Certis, retrieved on Feb. 17, 2009 at <<http://www.enpc.fr/fr/recherche/documents/08CERTISFRAG.pdf>>, 2007, Title Page and pp. 1-13.

Cohen-Or, et al., "Three-Dimensional Distance Field Metamorphosis", retrieved on Feb. 17, 2009 at <<http://delivery.acm.org/10.1145/280000/274366/p116-cohen-or.pdf?key1=274366&key2=8336394321&coll=GUIDE&dl=GUIDE&CFID=23042302&CFTOKEN=31161478>>, ACM Transactions on Graphics, vol. 17, No. 2, Apr. 1998, pp. 116-141.

Comaniciu, et al., "Mean Shift: A Robust Approach Toward Feature Space Analysis", retrieved on Feb. 17, 2009 at <<http://ieeexplore.ieee.org/stamp/stamp.jsp?arnumber=1000236&isnumber=21601>>, IEEE Transactions on Pattern Analysis and Machine Intelligence, vol. 24, No. 5, May 2002.

Criminisi, et al., "GeoS: Geodesic Image Segmentation", retrieved on Feb. 17, 2009 at <<http://research.microsoft.com/pubs/71446/Criminisi_eccv2008.pdf>>, ECCV, Part 1, LNCS 5302, Springer-Verlag, 2008, pp. 99-112.

Danielsson, "Euclidean Distance Mapping", Computer Graphics and Image Processing, Academic Press, 1980, pp. 227-248.

Fischer, et al., "Fast Approximation of High Order Voronoi Diagrams and Distance Transforms on the GPU", retrieved on Feb. 17, 2009 at <<http://www.cs.technion.ac.il/~gotsman/AmendedPubl/Fischer/voronoi.pdf>>, pp. 1-16.

Grady, et al., "Fast Approximate Random Walker Segmentation Using Eigenvector Precomputation", retrieved on Feb. 17, 2009 at <<http://cns-web.bu.edu/~lgrady/grady2008fast.pdf>>, Proceedings of CVPR, 2008, pp. 1-9.

Kolmogorov, "Convergent Tree-Reweighted Message Passing for Energy Minimization", retrieved on Feb. 17, 2009 at <<http://ieeexplore.ieee.org/ielx5/34/35279/01677515.pdf?tp=>>, IEEE Transactions on Pattern Analysis and Machine Intelligence, vol. 28, No. 10, Oct. 2006, pp. 1568-1583.

Levin, et al., "Colorization using Optimization", retrieved on Feb. 17, 2009 at <<http://people.csail.mit.edu/alevin/papers/colorization-siggraph04.pdf>>, 6 pages.

Li, et al. "Lazy Snapping", retrieved on Feb. 17, 2009 at <<http://www.cse.ust.hk/~cktang/sample_pub/lazy_snapping.pdf>>, ACM, 2004, pp. 303-308.

Lischinski, et al., "Interactive Local Adjustment of Tonal Values", retrieved on Feb. 17, 2009 at <<http://www.cs.huji.ac.il/~danix/itm/itm.pdf>>, 8 pages.

"Natural Image Colorization", retrieved on Feb. 17, 2009 at <<http://luanqing1021.googlepages.com/ColorEGSR07.pdf>>, Eurographics Symposium on Rendering, Eurographics Association, 2007.

Sethian, "Fast Marching Methods", retrieved on Feb. 17, 2009 at <<http://www.math.berkeley.edu/—sethian/2006/Papers/sethian.siam_fast.pdf>>, Department of Mathematics, University of California, Berkeley, Nov. 11, 1998, pp. 1-55.

Sigg, et al., "Signed Distance Transform Using Graphics Hardware", retrieved on Feb. 17, 2009 at <<http://delivery.acm.org/10.1145/1090000/1081456/20300012.pdf?key1=1081456&key2=0948394321&coll=GUIDE&dl=GUIDE&CFID=22489081&CFTOKEN=15169123>>, Proceedings of the 14th IEEE Visualization Conference (VIS 2003), IEEE, 2003, pp. 83-90.

Surazhsky, et al., "Fast Exact and Approximate Geodesics on Meshes", retrieved on Feb. 17, 2009 at <<http://research.microsoft.com/en-us/um/people/hoppe/geodesics.pdf>>, 8 pages.

Szczepanski, et al., "On the geodesic paths approach to color image filtering", Elsevier, 2003, pp. 1309-1342.

Tsitsiklis, "Efficient Algorithms for Globally Optimal Trajectories", retrieved on Feb. 17, 2009 at <<http://web.mit.edu/jnt/www/Papers/J058-95-jnt-traj.pdf>>, IEEE Transactions on Automatic Control, vol. 40, No. 9, Sep. 1995, pp. 1528-1538.

Unger, et al., "TVseg—Interactive Total Variation Based Image Segmentation", retrieved on Feb. 17, 2009 at <<http://www.icg.tugraz.at/pub/pdf/seg_bmvc08<<, 10 pages.

Veksler, "Stereo Correspondence by Dynamic Programming on a Tree", retrieved on Feb. 17, 2009 at <<http://www.csd.uwo.ca/faculty/olga/Papers/cvpr05.pdf>>, pp. 1-7.

Wang, et al., "Interactive Video Cutout", retrieved on Feb. 17, 2009 at <<http://www.cs.washington.edu/homes/juewang/juew/VideoCutout2005.pdf>>, 10 pages.

Office Action for U.S. Appl. No. 12/431,421, mailed on Apr. 11, 2012, Antonio Criminisi, "Image Processing Using Geodesic Forests," 10 pages.

* cited by examiner

GEODESIC IMAGE AND VIDEO PROCESSING

BACKGROUND

There are various known techniques of image and video processing, for example segmentation allows objects in an image to be separated following a user input and/or automatically. For example, this allows a foreground object in an image to be identified and isolated from the background, perhaps such that it can be placed against an alternative background. Other techniques use similar principles for performing denoising, panoramic stitching, or for adding effects like cartooning, smoothing, and the like. Many image processing techniques utilize computationally expensive energy minimization techniques. These techniques assume certain characteristics of the image or video (for example, that neighboring pixels of an object should be similar).

The embodiments described below are not limited to implementations which solve any or all of the disadvantages of known image and video processing techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of geodesic image and video processing is proposed. In an embodiment, the method uses a geodesic distance transform to construct an image filter. The filter can be used in a variety of image editing operations such as segmentation, denoising, texture smoothing, image stitching and cartooning. In one embodiment, the method may be made efficient by utilizing parallelism of the algorithm to carry out processing steps on at least two processing cores concurrently. This efficiency may enable high-resolution images and video to be processed at 'real time' rates without the need for specialist hardware.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
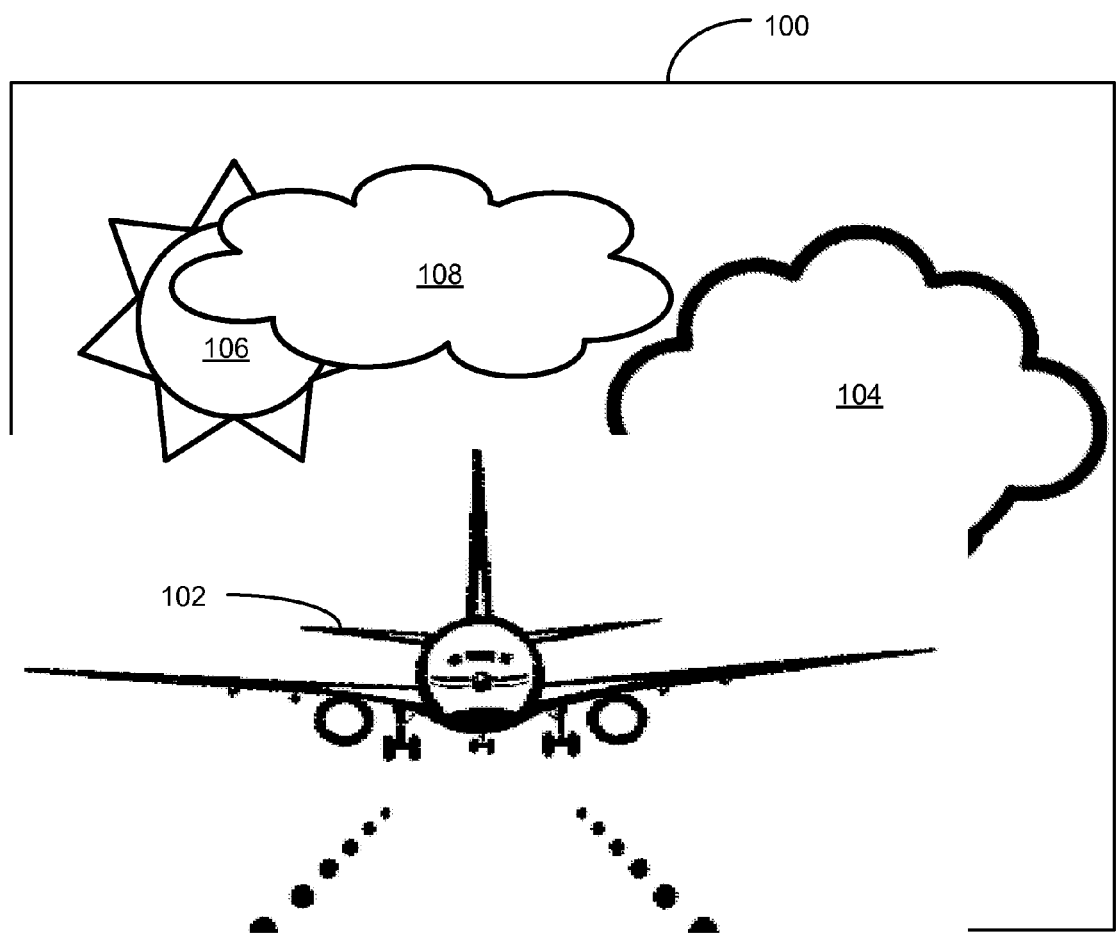
FIG. 1 is an image.

The detailed description provided below in connection with the appended drawings is intended as a description of the present examples and is not intended to represent the only forms in which the present example may be constructed or utilized. The description sets forth the functions of the examples and sequences of steps for constructing and operating the examples. However, the same or equivalent functions and sequences may be accomplished by different examples.

Although the present examples are described and illustrated herein as being implemented in a domestic computing system, the system described is provided as an example and not a limitation. As those skilled in the art will appreciate, the present examples are suitable for application in a variety of different types of computing systems.

Programs which perform automatic segmentation of images are known. Some such methods use a Markov Random Field (MRF), which divides the images into pixels. Briefly, such techniques work as follows:

A theoretical point above the segmented images is designated a source (usually designated by the letter s) and a point below the field is designated the sink (usually designated by the letter t). Theoretical 'T-links' connect each pixel to the source and the sink. Each pixel is also connected to each of its adjacent pixels by 'M-Links'. For a black and white 8-bit image, each pixel can be labeled with an intensity from 0 to 255 (i.e. there are 256 intensity levels). Processes such as 'graph-cut' or 'min-cut' attempt to find a minimum energy from the expression:

$$E = \sum_i U_i + \sum_{ij} V_{ij}.$$

Where U indicates the energy's pixelwise unaries (as will be familiar to the skilled person, unaries are defined mathematically in terms of likelihoods), and V indicates the pairwise term between a pixel i and a neighboring pixel j.

In a bilayer segmentation task, each of the sink and the source are associated with either the background or the foreground. This can be achieved in practice, for example, with a user applying a 'brush stroke' to the image using the mouse of his or her computing device to make a mark. Taking as an example an image comprising a black circle on a white background, the black circle is designated as the foreground with a brush stroke and the white is designated as the background with a second brush stroke. If the source is linked to the foreground, a black pixel will have low U and a white pixel will have a high U. V is large if adjacent pixels are very dissimilar from one another and is zero if there is no change between adjacent pixels. Graph-cut selects a region of the image and calculates an energy E. This might be expressed as "if this area is all foreground then the energy associated with this is X". When the foreground has been correctly identified, the energy X is at its minimum.

Such methods find a global minimum by testing every possible segmentation. It can be readily appreciated that the number of segmentations dramatically increases for high resolution images and, if one considers video, a powerful processor would be needed to keep up with the changing frames as each frame must be examined individually and this may be beyond the capability of standard computing devices. Therefore, graph-cut-based techniques do not scale up well, which limits their application to high resolution images and to video.

In addition, the technique described above assumes that adjacent pixels in an object will have similar appearance (e.g. intensity levels or color statistics). In practice, some objects have highly variable appearance. Consider, for example, an image of a sun-lit tree. The leaves will let light through while the branches block light, yet the leaves and branches are part of the same object. Equally, when processing intricate objects which have narrow elements, these elements may be incorrectly identified as 'noise', particularly if they are surrounded (or nearly surrounded) by pixels of a background object, and may therefore be incorrectly assigned to the background object. In addition, the graph-cut algorithm does not lend itself to easy parallelization because of its structure.

The processing method described below considers a restricted, 'sensible', subset of all possible segmentations by utilizing distance transforms.

Figure 4:
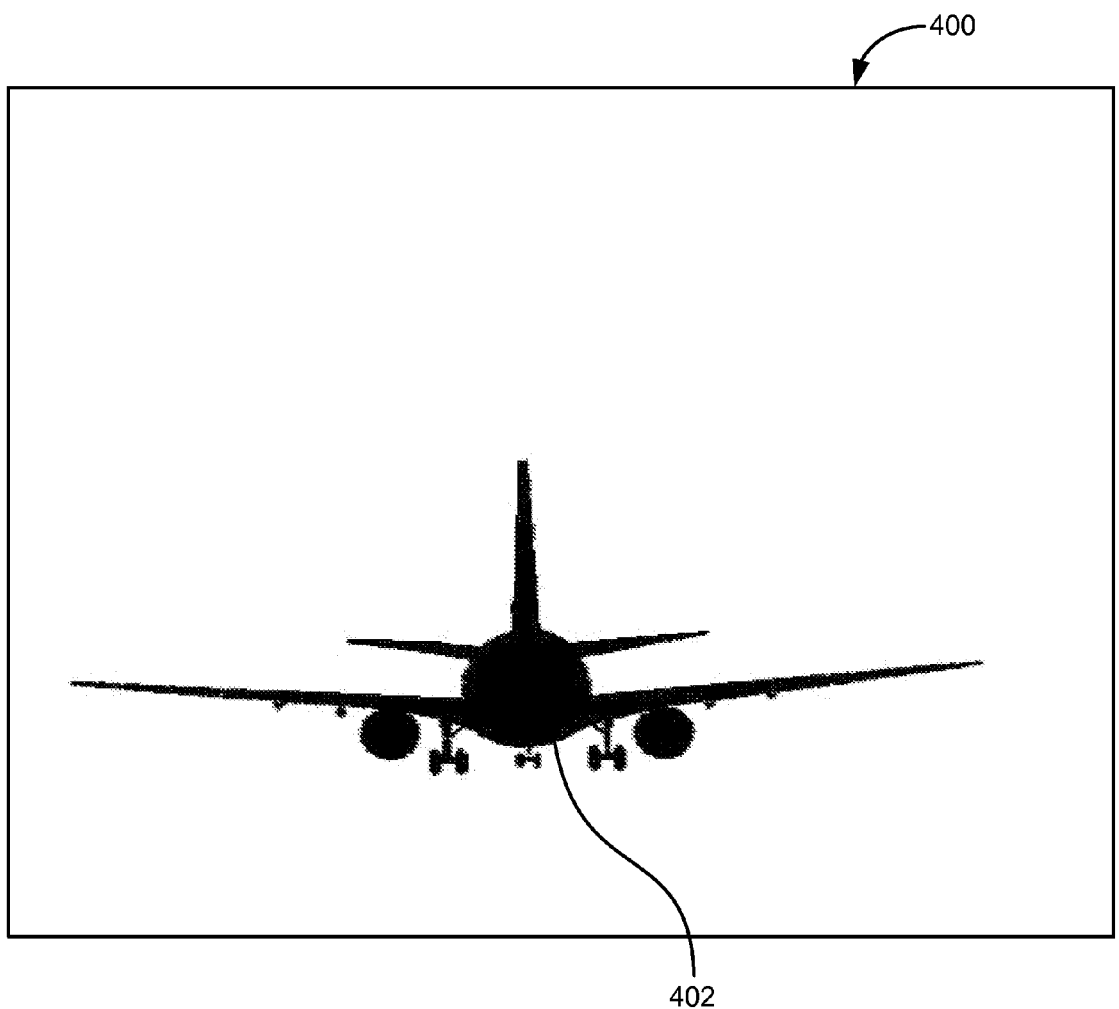
FIG. 4 shows a mask generated using geodesic algorithms.
Figure 5:
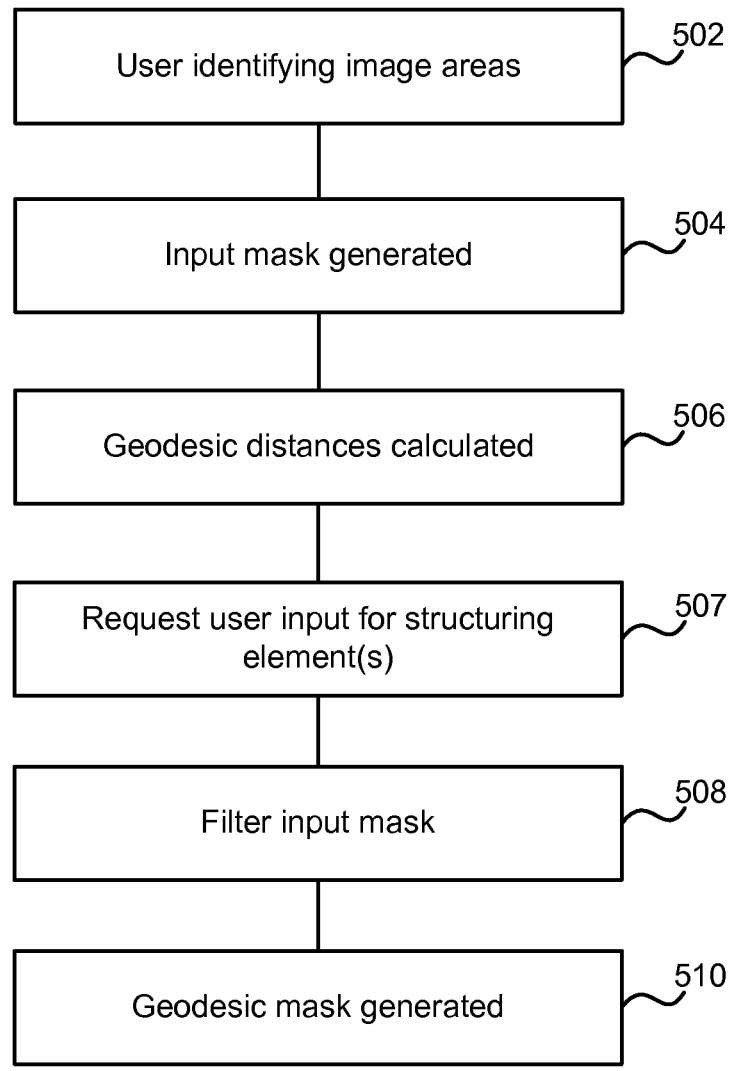
FIG. 5 shows a flow diagram of a method of generating the mask of FIG. 4.

Distance transforms in images are now described with reference to the image shown in FIGS. 1 to 4 and the flowchart of FIG. 5. FIG. 1 shows an image 100 of an airplane 102 coming in to land on a runway. Beside the runway, there is a tree 104; the sun 106 and a cloud 108 can be seen in the background.

Figure 2:
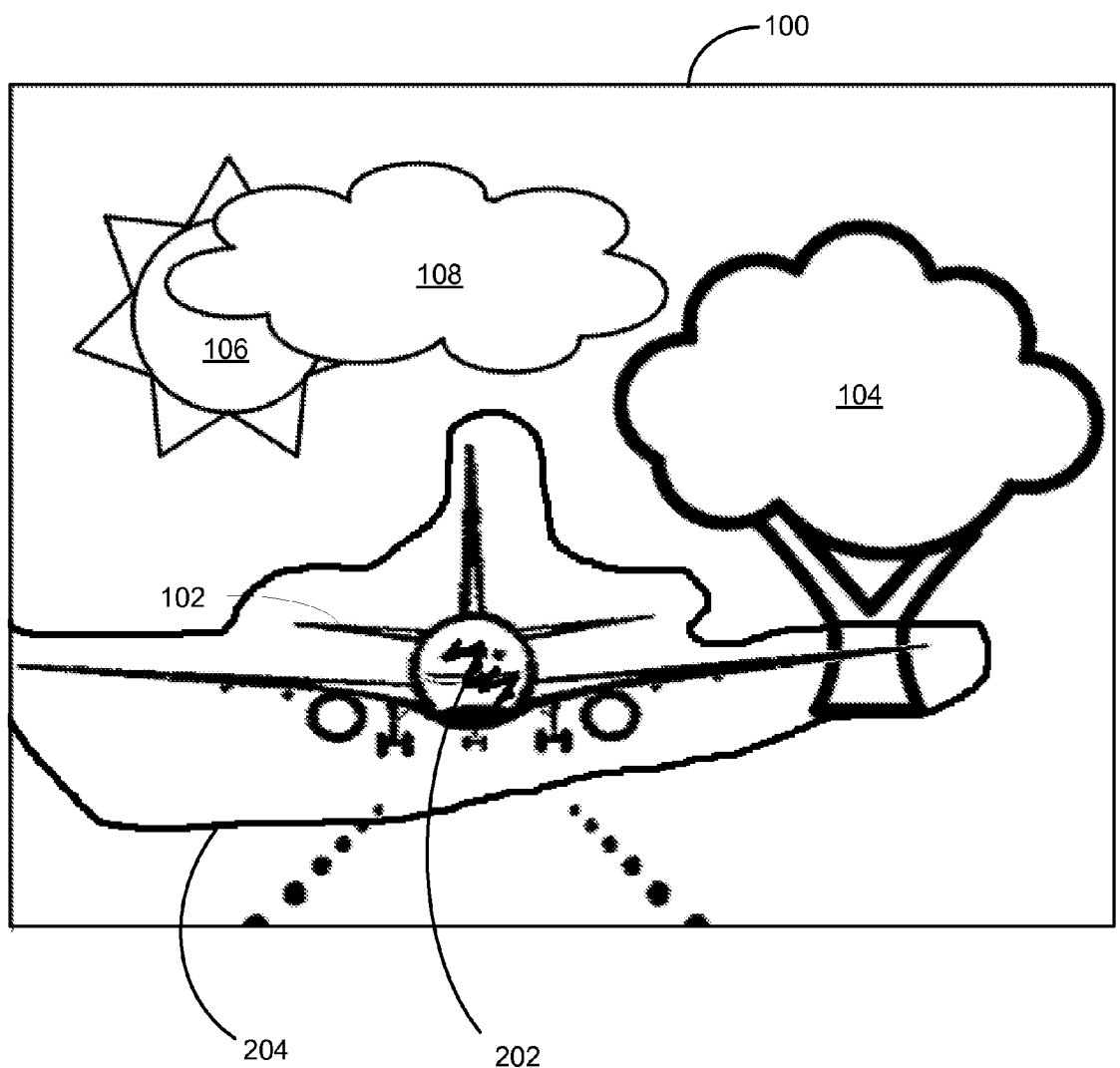
FIG. 2 shows the image of FIG. 1 with user-applied brush strokes.

The first stage (block 502) of image processing in this example is to obtain user input to designate the foreground and the background. This is achieved by the user placing 'brush strokes' 202, 204 on the image 100, as is shown in FIG. 2. As will be familiar to the skilled person, in other examples, the foreground, background or other objects may be designated through user interaction in other ways or using automatic techniques.

Figure 3:
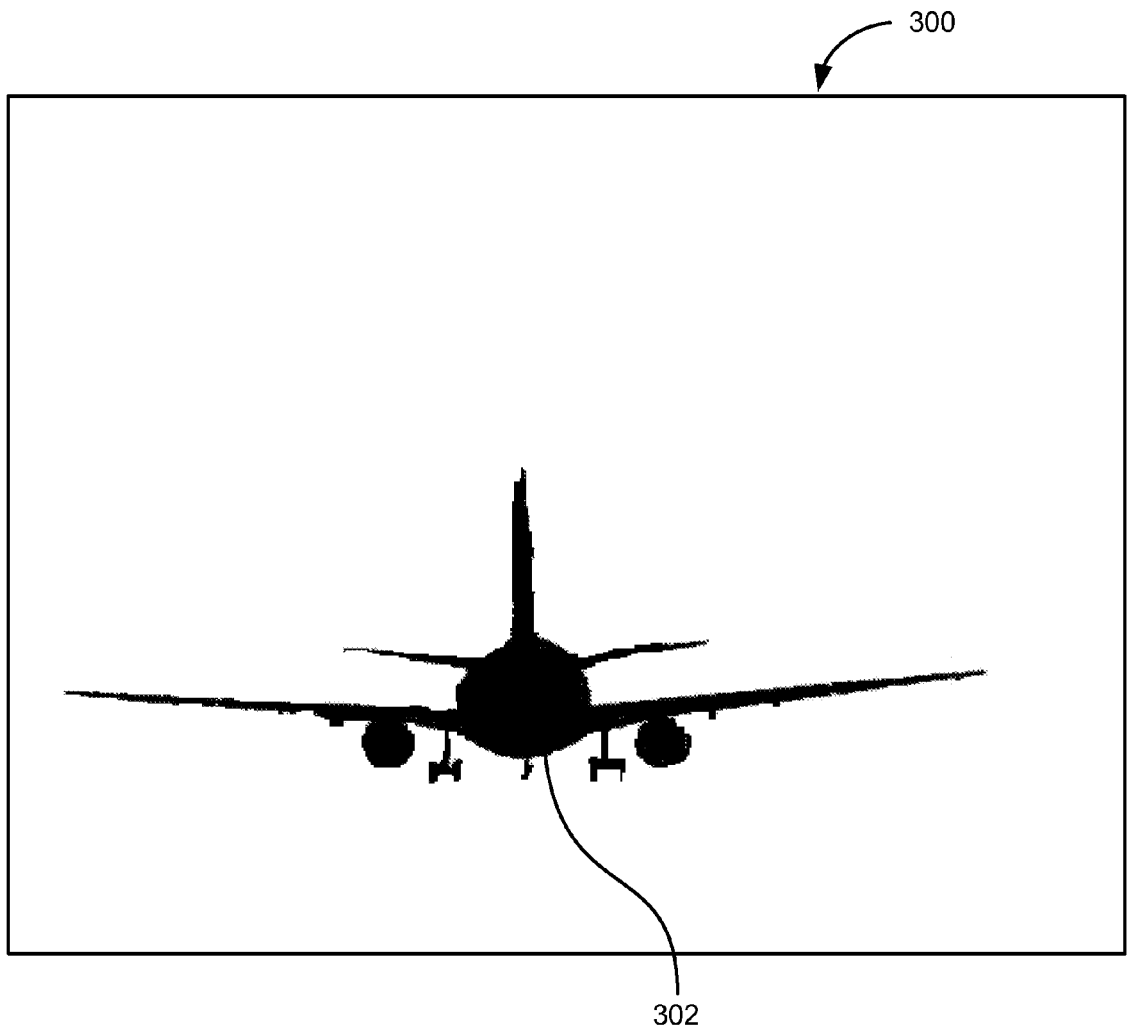
FIG. 3 shows an input mask generated from the image of FIG. 1.

Once the foreground and background have been designated, a mask 300 is generated (block 504), which comprises a mask object 302 which approximately corresponds to the shape of the foreground object, as is shown in FIG. 3. Again, there are various known techniques for generating masks, any of which could be employed.

Each pixel outside the mask object 302 is assessed to determine whether it belongs to the foreground object or to the background (block 506). In some known methods, this is carried out linearly, i.e. the chance that the pixel is part of the foreground object declines linearly with its distance from the edge of the mask object 302. In the method now disclosed, each pixel is given a weighting based not just on its spatial distance but also based on the image gradient, which therefore brings in an assessment of edges as the image gradient (i.e. changes in pixel qualities such as intensity, color, etc.) will be high at the edges of objects. In the equation below, the factor γ weighs the contribution of the image gradient versus the spatial distances. The term "geodesic distance" is used generally to indicate any weighted distance.

Given an image I, a mask M (with $M(x) \in \{0,1\} \forall x$) defining a mask object 302 Ω, with $x \in \Omega \Leftrightarrow M(x)=0$ the geodesic unsigned distance of each pixel x from Ω is defined as:

$$D(x;M, \nabla I) = \min_{x' \in \Omega} d(x, x'), \text{ with}$$

$$d(a, b) = \min_{\Gamma_{a,b}} \int_0^1 \sqrt{|\Gamma'(s)|^2 + \gamma^2(\nabla I \cdot \Gamma'(s)/|\Gamma'(s)|)^2} \, ds$$

where $\dot{\Gamma}_{a,b}$ is a path between points a and b parameterized by the scalar s; $\dot{\Gamma}(s) = \partial \Gamma_{a,b}/\partial s$.

There are two main types of distance transform algorithms: Borgefors-Toivanen algorithms based on kernel operations applied sequentially over the image in multiple passes and Fast Marching Algorithms based on the iterative propagation of a front whose velocity is a function of the geodesic weights. The complexity of both types of algorithms is linear with the number of pixels, and both produce good approximations and either may be used (or indeed an alternative algorithm may be used in some examples). However, in this example, Borgefors-Toivanen algorithms are used as these access contiguous areas in the image memory, which may yield an increased speed of execution.

A filtering operator which may be employed and which builds upon geodesic distance transforms is now described.

As will be familiar to the skilled person, two basic morphological operations which are performed on images are erosion and dilation. These can be explained in terms of binary structured elements acting on binary images, as follows: For dilation, a pixel is assigned the maximum value of all its neighboring pixels. Therefore, in a binary image, if any of the neighboring pixels is set to the value 1, the subject pixel is set to 1. For erosion, a pixel is assigned the minimum value of all its neighboring pixels. In a binary image, if any of the neighboring pixels is set to 0, the subject pixel is set to 0. The processes have effect on the image which corresponds to their name-dilation will tend to blur the edges of a mask object 302 into the surrounding space and erosion will cause the surrounding space to enter into the mask object 302 space.

In the method now described, these operations are redefined as functions of real-valued image distances. As will be familiar to the skilled person, the expression 'real-valued' means that the distance function is made up of real numbers, not integers. The definition of the distance D above leads to the following signed geodesic distance from the object boundary:

$$D_s(x;M,\nabla I) = D(x;M,\nabla I) - D(x;1-M,\nabla I).$$

Dilation and erosion operations which may be performed on the mask 300 are defined as $$M_{d,e}(x) = [D_s(x;M,\nabla I) > \theta].$$

with M being the mask 300, subscripts d,e indicating the two operations dilation and erosion respectively and θ is the diameter of a disk-shaped structuring element (which in this example is a disk-shaped structuring element) which sets the number of pixels which are to be considered to be 'neighboring' pixels. Typical disc diameters are of the order of 10 pixels. Dilation is obtained with θ>0 and erosion with θ<0, respectively.

The indicator function [.] returns 1 if the argument is true and 0 otherwise.

Two passes may suffice when γ=0 (no contribution from image gradients); and in other examples, even when γ>0. However, in other examples more passes may be necessary if γ>0.

Given mask 300 $M(x) \in [0,1]$, in the first pass the mask 300 is scanned from the top-left to the bottom-right corner and an intermediate function C is iteratively constructed as follows:

$$C(x, y) = \min \begin{cases} C(x-1, y-1) + \sqrt{p_2^2 + \gamma \nabla I_{NW}(x,y)^2} \\ C(x, y-1) + \sqrt{p_1^2 + \gamma \nabla I_N(x,y)^2} \\ C(x+1, y-1) + \sqrt{p_2^2 + \gamma \nabla I_{NE}(x,y)^2} \\ C(x-1, y) + \sqrt{p_1^2 + \gamma \nabla I_W(x,y)^2} \\ vM(x,y) \end{cases}$$

where the north-west, north, north-east and west components of the image gradient are used. The $p_1$ and $p_2$ local distances are usually set to $p_1=1$ and $p_1=\sqrt{2}$ or fixed-point approximations thereof. In the second pass, the algorithm proceeds from the bottom-right to the top-left corner and applies the corresponding kernel to C(x) to obtain the final D(x) distance. Larger kernels may produce better approximations to the exact distance.

As will be familiar to the skilled person, dilation and erosion can be used in combination to implement other image processing operations. Two such operations are 'opening' of an image and 'closing' of an image. Opening of an image is an erosion followed by a dilation, using the same structuring element (disk diameter θ) for both operations and closing of an image is dilation followed by an erosion with the same structuring element. Opening removes small objects (noise) from an image while preserving the shape and size of the object in the image and closing removes noise from the background.

Closing and opening filters are defined as:

$$M_c(x) = [D(x; 1 - M_d, \nabla I) > \theta_e] \text{ and}$$

$$M_o(x) = [D(x; M_e, \nabla I) > \theta_d],$$

respectively. As these filters are now defined in terms of real-valued distances, they can be implemented efficiently and can be used to introduce contrast sensitivity. The filters are idempotent (as will be familiar to the skilled person, a unary operator f is idempotent if f(f(x))=f(x)).

In carrying out the method described herein, user input for the structuring elements is requested (block 507). In this example, the user specifies a single number for L, which may be on the order of 0 to 50 pixels, and the filtering operations (block 508) are then performed on a mask 300 to allow a final mask 400, as is shown in FIG. 4, to be produced which comprises an object 402 which accurately lines up with strong object boundaries (block 510). In one embodiment, the final mask may be used for performing at least one of image segmentation, denoising, cartooning, texture smoothing and stitching.

Known closing and opening filtering operations are asymmetrical in the sense that the final result depends on the order in which the two component operations are applied to the mask 300. In some examples, a user will simply want to define the dimension of the regions to be removed or identified by setting θ appropriately (e.g. noise speckles or thin areas of an image object) and apply the filter without considering about the order of operations within the filter. This can be addressed by defining the following distance-based, symmetrical filter:

$$M_s(x; M, I) = [D_s^s(x; M, \nabla I) > 0]$$

where the symmetric, signed distance $D_s^s$ is defined as:

$$D_s^s(x, M, \nabla I) = D(x; M', \nabla I) - D(x; M'', \nabla I) + \theta_d - \theta_e,$$

with $\theta_e > 0, \theta_d > 0, M' = [D_s(x; M, \nabla I) > -\theta_e]$ and $M'' = [D_s(x; M, \nabla I) < \theta_d]$. The term $\theta_d - \theta_e$ enforces the idempotence property.

Formulating filters in terms of real-valued distances allows symmetrical mixing of closing and opening to be performed with the two variables $\theta_d$, $\theta_e$, which are measured in pixels and are therefore relatively intuitive to a user as they correspond to the maximum size of the foreground and background noise speckles and/or the size of detailed elements within the image.

The symmetrical filter defined above generalizes previously known filters by adding symmetry and contrast-sensitivity. By setting γ=0 (i.e. there is no contribution from the image gradient) and then $\theta_d=0$ or $\theta_e=0$, conventional closing or opening are reproduced respectively.

Segmentation can be achieved using a restricted energy minimization technique. The technique is "restricted" as, rather than exploring all possible segmentations, only a few, 'sensible' segmentations are considered. The energy is computed for each of these segmentations and the one with minimum energy selected as the final segmentation.

Segmentation is carried out through minimizing an energy of type:

$$E(z; \alpha) = U(z, \alpha) + \lambda V(z, \alpha)$$

where z indicates the image data and α is the per-pixel labeling (i.e. each pixel is labeled as foreground or background and α has the corresponding value of Fg/Bg). The subscript n indexes the pixels and Fg/Bg indicates foreground/background respectively. λ weighs the contribution of the pairwise potentials with respect to the unaries. Typically, λ may be between 0 and 5 and may be chosen by a user or predetermined. This is comparable with the graph-cut energy described above.

The unary potential U is defined as the sum of pixel-wise likelihoods of the form $U(z, \alpha) = -\Sigma_n \log p(z_n|\alpha_n)$; and the data-dependent pairwise term is $V(z, \alpha) = -\Sigma_{m,n \in N}[\alpha_n \neq \alpha_m] \exp(-|z_n - z_m|/\eta)$. The assessment of V is carried out by considering all 8 of its immediate neighbors, which may be referred to as an '8-neighborhood clique' N.

The minimization of the energy is made efficient by restricting the search for solutions for α* to a restricted 2D manifold of all possible segmentations. θ can be defined as $\theta = (\theta_d, \theta_e) \in S$, with S being a 2D manifold of parameters. This provides a search space.

S depends on the image resolution and on the spatial extent of noisy regions in the unary signal. For a Video Graphics Array image with a standard screen size of 640 by 480 pixels, an appropriate value of S may be $S = \{5, 6, \ldots, 15\} \times \{5, 6, \ldots, 15\}$.

As described earlier, given a value of θ, the symmetrical filter has the property of removing isolated regions with dimensions which are less than the disk diameters from the foreground and background in binary images. Therefore, the filter is adapted to work on real-valued unary functions: for different values of the argument θ different levels of spatial smoothness will be obtained and thus different energy values can be calculated. The segmentation sought is $$\alpha^* = \alpha(\theta^*), \text{ with } \theta^* = \underset{\theta \in S}{\operatorname{argmin}} E(z, \alpha(\theta))$$

In the binary segmentation problem, given the real-valued log likelihood ratio (i.e. the likelihood of a pixel having been correctly designated as a background of foreground pixel):

$$L(x) = \log p(z_{n(x)}|\alpha_{n(x)} = Fg) - \log p(z_{n(x)}|\alpha_{n(x)} = Bg)$$

The mask $M(x) \in [0,1]$ is redefined as a log-odds map $M(x)=\sigma(L(x))$ where $\sigma(\cdot)$ is the sigmoid transformation $\sigma(L)=1/(1+\exp(-L/\mu))$. The unsigned distance is in turn redefined as:

$$D(x; M, \nabla I) = \min_{x'}(d(x, x') + vM(x'))$$

where x' a dumb pixel in the image.

v(which is trained discriminatively) establishes the mapping between the unary beliefs and the spatial distances. Different segmentations are achieved for different values of θ. The design of the filter ensures that the segmentation proposals α(θ) are spatially compact and agree with the unaries. Edge alignment is achieved by the geodesic nature of the algorithm.

The value of θ* corresponding to the lowest energy $E_{GeoS}=E(z,\alpha(\theta^*))$ is now sought. For each value of θ, the segmentation operation requires 4 unsigned distance transforms. Thus, an exhaustive search for $N_d \times N_e$ values of θ would require $4 N_d N_e$ distance computations, where $N_d$ and $N_e$ are the number of dilation/erosions to be performed. However, by pre-computing distances this is reduced to only $2+N_d+N_e$ operations. In fact, the distance D need only be computed once (2 unsigned distances) for each image as it does not depend on θ. If $S=\{5, 6 \ldots, 15\} \times \{5, 6 \ldots, 15\}$, then $N_e$ and $N_d$ are 10.

The above distance transforms are independent of each other (i.e. the result of one transform is not required for another) and can therefore be computed in parallel on appropriate hardware. Therefore, in a machine with $N_c$ processors (i.e. processing cores) the total time T taken to run exhaustive search is then $$T = \left(2 + \frac{N_d + N_e}{N_e}\right)t,$$

where t is the unit time required for each unsigned distance transform. An economical gradient descent optimization strategy may also be employed.

In the interactive segmentation example shown in FIGS. 1 to 4, the unaries are obtained by: i) computing histograms over the RGB space quantized into 25 bins from the user provided strokes, and ii) evaluating the Fg and Bg likelihoods on all image pixels. Segmentation is achieved by interactively choosing a value of $\theta=(\theta_d,\theta_e)$ and applying the filter to the mask 300. The parameters $(\theta_d,\theta_e)$ specify the size of isolated regions to be removed from the foreground and background and the degree of detail in the images (e.g. the thickness of the struts on the under carriage in the FIGs), thus imposing smoothness and compactness of the segmentation.

Segmentation is achieved very quickly with very little user interaction (in this example, just two strokes and the input of a value for θ suffice).

The four distance transforms performed in the filtering process form two pairs of transforms, wherein each pair of transforms are independent of each other in the sense that one pair of transforms does not use the outcome of the other pair of transforms. Therefore the transforms in each pair may be computed in parallel on a dual-core processor. The time T taken to run a segmentation iteration is then T=2t, where t is the unit time required for each unsigned distance transform.

Color models can be updated iteratively (typically two iterations suffice) to achieve high accuracy of segmentation with little interaction.

Denoising, smoothing and cartooning are all related to each other in the sense that the desired output is an image which presents spatially smooth appearance while respecting sharp transitions at object boundaries. They therefore provide example uses of the filters set out above, in addition to the segmentation described above.

Denoising a noisy input image can be implemented on an 8-bit image by running conventional binary morphology on each intensity level and then recombining the 256 binary images into the final, filtered output. Conventional closing or opening filtering operations may be replaced with a geodesic filter, which adds edge sensitivity as follows.

In one example, $\theta_e=0$ and therefore only one geodesic distance transform is required to produce a mask:

$$M_{dilate}(x;M,I)=[D(x;M,\nabla I)<\theta_d]$$

The input image I is split into k binary masks $\{M^l|l=0 \ldots k-1\}$, where each mask is given by $M(x)=[I(x) \in [l/k,(l+1)/k)]$ The masks simply indicate the presence (0) or absence (1) of a pixel in a given intensity range. The geodesic dilation filter is then applied to each mask obtaining a new set of masks $\{N^l\}$ The final image I' is obtained as the mean over several levels $$I'(x)=<(l+0.5)/k*(1-N^l(x))>_{l=0 \ldots k-1 and N^l(x)=0'}$$

where <.> indicates the mean operator. In color images each channel is treated independently. Alternative transformations of the geodesic distance signal and other pixel mixing protocols may be applied in other examples.

Texture smoothing is achieved with the same algorithm as the one used for denoising, but with typically larger values of $\theta_d$, for example 50 pixels to allow a larger area of influence for each pixel and thus a longer range "diffusion" effect. It will be noted that the complexity of filtering algorithm is linear with the number of pixels and independent of the spatial extent of the filter.

Since the different image levels are processed independently from one another, the algorithm can be readily implemented to run on multiple processing cores.

To apply a cartoon effect to an image, the geodesic filter is used to perform edge-preserving smoothing. Ink strokes are overlaid using as a mask computed as the contrast-enhanced gradient magnitude of the smoothed image. Computing the gradient map on the smoothed image rather than the original image ensures long, visually pleasing strokes. The technique can also be applied to video; it avoids hard commitment and retains smoothly-varying gradients, thus may reduce temporal flicker.

Figure 6:
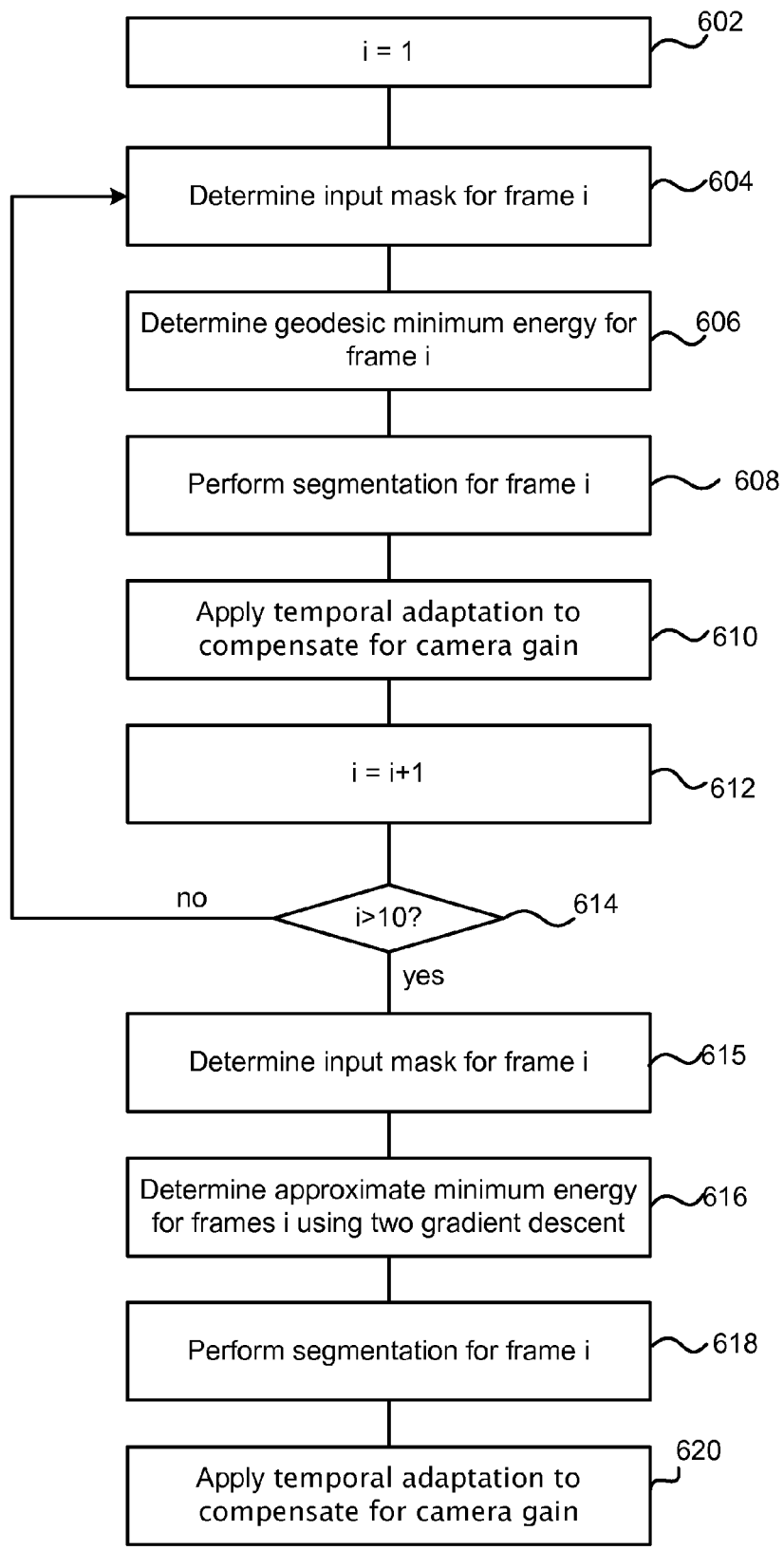
FIG. 6 shows a flow diagram of a method of processing video footage.

The method can be used for segmenting and/or smoothing video and, given sufficient processing capability, video can be processed at interactive rates such that processing of 'live' video (i.e. processing streamed video such that there is no apparent or significant delay between receiving the video and displaying the processed video) is possible. A method for segmenting video is now described with reference to the flow diagram of FIG. 6.

A geodesic energy is defined for a first and then subsequent frames, where the input masks for each frame are modeled as a per-pixel Gaussian for the background and a single Gaussian learned from the previous frame for the foreground. In some examples, exhaustive energy minimization may be carried in every frame, but in the present example, exhaustive energy minimization is run over a 10×10 grid for θ on the first few frames of a sequence.

A counter is set to 1 and the process is initialized (block 602). An input mask is determined for first frame (block 604) and the geodesic minimum energy for that frame is found using the algorithms set out above (block 606). The segmentation is performed (step 608) and temporal adaptation may be used to compensate for automatic changes in the camera gain (block 610). As will be familiar to the skilled person, Automatic Gain Control (AGC) is a standard algorithm implemented by all camera manufacturers. AGC allows automatic brightening/darkening of the camera picture based on changes of illumination in the environment being recorded (e.g. opening a window, shutting the door, turning the light on or the like). As the algorithm is known, the effect can be compensated.

The counter is incremented by 1 (block 612) and this process is repeated for the first 10 frames. In subsequent frames (i.e. if it is determined that the counter is greater than 10 (block 614)), an input mask is determined (block 615) but the geodesic energy is not found exhaustively. Instead, two gradient descent steps are used to determine a good approximate minimum (block 616). As will be familiar to the skilled person, gradient descent is an optimization algorithm which finds a local minimum of a function by taking steps proportional to the negative of the gradient (or the approximate gradient) of the function at the current point. The segmentation for the frame is then performed (step 618) and temporal adaptation is used to compensate for AGC. In some examples, global soft constraints may be imposed on the foreground area (see below).

Geodesic distances can be defined in an n-dimensional space, with n>2. Hence the algorithm is not restricted to 2D image data and can readily be extended to n-D data such as video batches or medical images (typically 3D or even 4D). A video cube (709×540×120 voxels) may be segmented all at once as opposed to on a frame-by-frame basis thus reducing temporal instability.

This allows segmentation of the space-time volume defined by a time-lapse video for example. A couple of user-entered brush strokes in only two frames may suffice to define good unaries in all frames.

The methods described above can be used to produce 3D segmentations which are smooth both in space and time. The geodesic filter may also be applied to medical images. User brush strokes in selected MRI slices may allow the methods described herein to correctly separate bones and blood vessels from soft tissue, directly in the 3D image volume. Highlighting of individual organs may be achieved by repeated segmentation steps.

Other applications of the algorithm proposed here include efficient image and video colorization, edge-aware brush painting, contrast-sensitive tone mapping and video sketching.

In some examples, global energy constraints may be used to correct or improve filtering. For example, if a foreground object takes up about 70% of the image, an additional energy term G may be defined, for example, as $G=|Area_{fg}/Area-0.7|$ to encourage the foreground region to cover about 70% of the image area. G may capture other global properties of image regions and can be used, e.g. to encourage constraints on areas, global appearance, shape or context.

Alternatively or additionally, soft constraints on global appearance statistics or shape may be imposed and/or larger clique energies can be explored.

Segmentation results on images can be assessed for accuracy by comparing geodesic and min-cut segmentations to each other and to a manually labeled ground truth by counting the number of differently classified pixels. The min-cut and geodesic results have been found to be close visually and quantitatively, with the number of differently labeled pixels below 1% of the image area and all segmentations are close to ground truth.

Contrast sensitivity enables thin protrusions to be segmented correctly (despite the absence of flux in the energy). Contrast sensitivity is especially important with poor unaries. Using finite patches to compute stereo likelihoods causes their misalignment with respect to the foreground boundary. Using $\lambda>0$ in geodesic processing encourages the segmentation boundaries to correctly snap to an object's silhouette.

The geodesic filter may be able to remove "holes" with little effect on pointed appendices. Thus, the methods described herein are less affected than min-cut by the so called "shrinking bias" problem. Specifically, the geodesic processing has a greater tendency to preserve pointed segmentation appendices. This effect can also be interpreted by saying that those segmentations which remove small pointed appendices are not contained in the restricted subspaces searched by the geodesic algorithm. The increased robustness of geodesic processing with respect to $\lambda$ justifies using a fixed value of $\lambda$ when segmenting different images or video frames. For example, images may generally be successfully segmented by an algorithm with a fixed $\lambda=3$.

Figure 7:
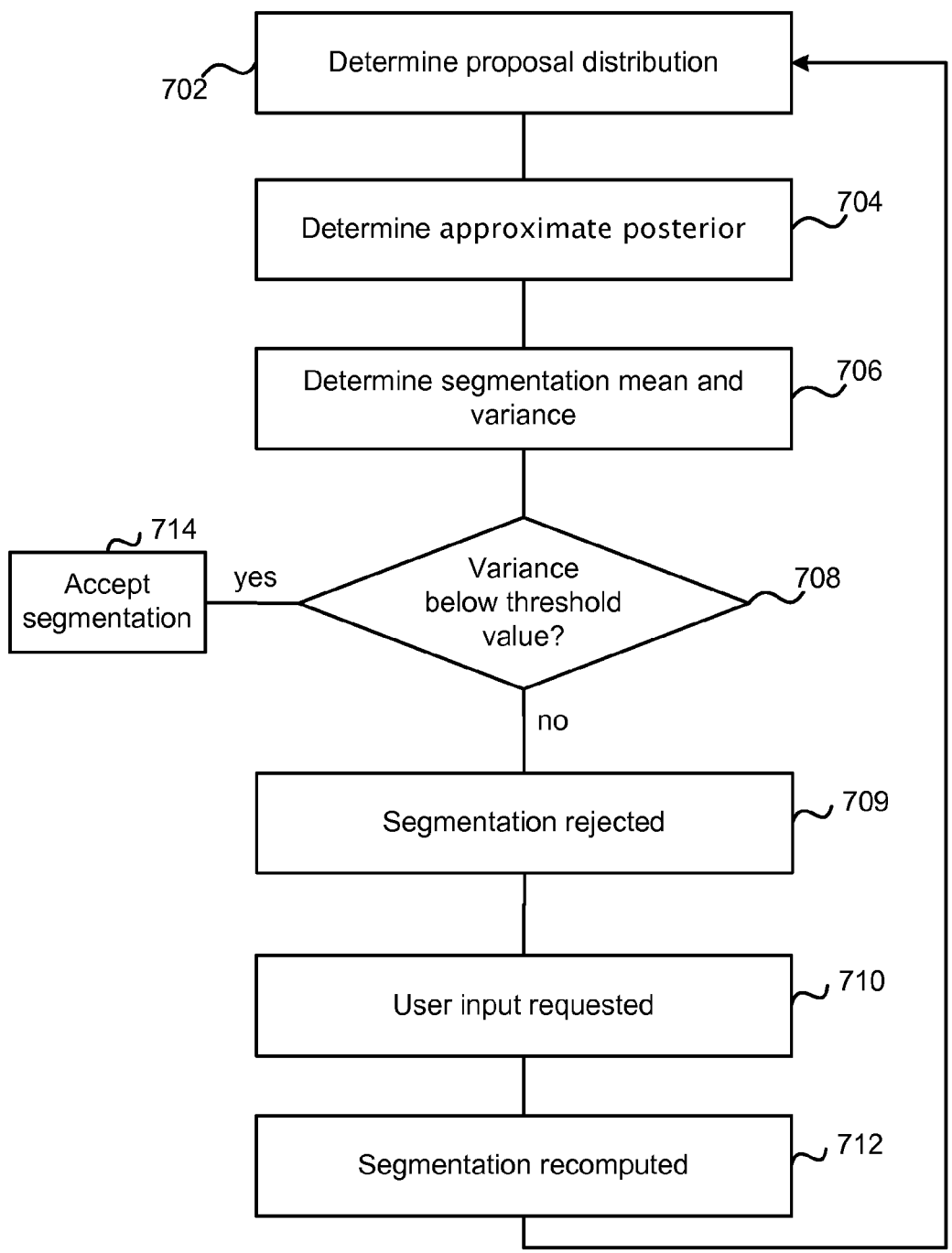
FIG. 7 shows a flow diagram of a method of using user interaction to improve the segmentation of an image.

It is possible to assess the accuracy of a particular segmentation by calculating a 'posterior probability', and using this measure to determine whether further user input is required as is now described with reference to the flowchart of FIG. 7. As will be familiar to the skilled person, a posterior probability is a conditional probability which is assigned after evidence (e.g. pixelwise unary likelihoods) has been taken into account.

The complete Conditional Random Field (CRF) posterior is defined as $p(\alpha)=1/Z_p \exp(-E(\alpha)/\sigma_p)$ (where Z is a normalizing function, the subscript p refers to a distribution p, $\alpha$ is the segmentation, and $\sigma$ is a parameter). However, importance sampling allows an approximation of $p(\alpha)$ by its Monte Carlo mean $\tilde{p}(\alpha)$. The proposal distribution $p(\alpha)$ can be efficiently computed as $q(\alpha)=1/Z_q \exp(-E(\alpha(\theta))/\sigma_q), \forall \theta \in S$ (and $q(\alpha)=0\ \forall \theta \notin S$) (block 702).

The approximate posterior $\tilde{p}_N^q(\alpha)=1/n\Sigma_{i-1}^n p(\alpha(\Theta_i))/q(\alpha(\Theta_i))$ with N samples $\Theta_i$ (where $\Theta_i$ is a pair of $\theta$ values (as above), sampled in the search space S) may be generated from a uniform prior over S (block 704). Since S is a small, quantized 2D space, in practice $\Theta_i$ may be generated by exploring the entire S. The parameters $\sigma_q$, $\sigma_p$ have been trained discriminatively from manually-labeled trimaps during development of the algorithm and may therefore be standard values in an algorithm employed by an end user (for example as part of an image editing software package). The estimated CRF posterior $\tilde{p}_N^q(\alpha)$ is used to compute the segmentation mean $\bar{\alpha}=\int^\alpha \alpha \tilde{p}_N^q(\alpha) d\alpha$ and the associated variance $\Lambda_\alpha$.

In this example, the quantity $\Lambda_\alpha$ is used to detect unstable segmentations. If (block 708) $\Lambda_\alpha$ is more than a threshold amount, for example 0.1, the segmentation is rejected (block 709) and the user is asked to introduce more brush strokes (block 710). In this example, the user is presented with an enlarged view of the region of the image which shows uncertainty and the user can indicate which portions of that region belong to which segmentation (background or foreground, whether they are noise, etc). The segmentations are then recomputed to provide an improved result (block 712). This process can be carried out iteratively until the variance is within predetermined limits, in which case the segmentation is accepted (block 714) and further image processing may be carried out. In some examples, the assessment is carried out on regions of the image while in other examples the assessment is carried out on an image as a whole.

Proposals sampled from S may also be fused together via Quadratic Pseudo-Boolean Optimization (QPBO).

For a standard Video Graphics Array image (640×480 pixels) t=0.9 ms for a single distance transform, then the whole geodesic smoothing algorithm will take $$T = t \frac{6N_l}{N_c} \text{ms}$$

for a color image; with $N_l$ the number of image levels and $N_c$ the number of processors. The following table shows the time T as a function of $N_l$ with $N_c$=4. In the example of the FIGs, $N_l$=2 (foreground and background) but in other examples $N_l$ could be higher. For example, the tree 104, the sun 106 and the cloud 108 could all be treated as separate foreground images, giving $N_l$=5.

| $N_l$ | 4 | 16 | 64 | 256 |
|---|---|---|---|---|
| T(ms) | 5 | 22 | 86 | 346 |

Different smoothing results can be obtained by varying the number of quantized color levels. Reducing the number of levels to ¼ often still produces reasonable results with a gain in computational efficiency.

Overlapping images may be stitched together by interactively setting θ and γ and letting the algorithm select the optimal path separating the two images. The log likelihood ratio map is set as L∈{−inf,0,inf} with L=0 in the overlapping region. The geodesic filter encourages the separating path to lie in the overlap region and follow strong image edges. High quality stitching results may be achieved in only ~10 ms on 2 cores and ~4 ms on 4 cores.

It will be noted from the above that, in contrast to graph-cut, the geodesic energy and its minimization algorithm are decoupled. This means that the choice of class of models is no longer dominated by considerations of tractability and that the geodesic minimization approach disclosed herein is general and can be applied to all kinds of energy models. By way of contrast, graph-cut can be applied to only a small subset of all possible energy models. Run times utilizing the method and algorithms described herein can be compared to corresponding run times for implementations of graph-cut (or min-cut). Data-level parallelism is made possible as four of the five terms in the Energy minimization function are independent of the current scan-line.

Run time curves obtained when segmenting an image as a function of image size show "superlinear" behavior (roughly quadratic) for graph-cut/min-cut, while those for the methods described above are substantially linear. In experimental implementations of segmentation of a 1600×1200 image, the methods described herein ($N_c$=4, $N_d$=$N_e$=10) provides a 12-fold speed-up with respect to min-cut.

As was described above in relation to FIG. 6, on-line video segmentation may be achieved by gradient descent because of high temporal correlation of the energy in consecutive frames. Using two steps of gradient descent on 2×2 grids (which provide typical values) produces a 21-fold speed-up. The methods described herein provide an efficiency gain over min-cut which increases non-linearly for larger resolutions. For instance, on a 25 Mpix image the methods described herein ($N_c$=4, $N_d$=$N_e$=10) produces a 33-fold speed-up and, if the method further employs gradient-descent, a 60-fold speed-up with respect to min-cut can be seen.

The method described herein is also efficient in terms of memory allocation. Min-cut implementations have a high memory requirement and can fail to execute for high resolution images, e.g. image sizes>2 Mpix. While min-cut's run times depend on the quality of the unary (the more uncertain, the slower the minimization), the methods described herein may have a fixed running cost, making its behavior more predictable. As will be familiar to the skilled person, min-cut uses search trees to find the optimal solution and this requires a heavy use of memory which is avoided in the geodesic technique described herein. When comparing min-cut with the geodesic algorithm defined above, the geodesic algorithm yielded a roughly 30-fold speed-up factor while avoiding memory connectivity issues.

Figure 8:
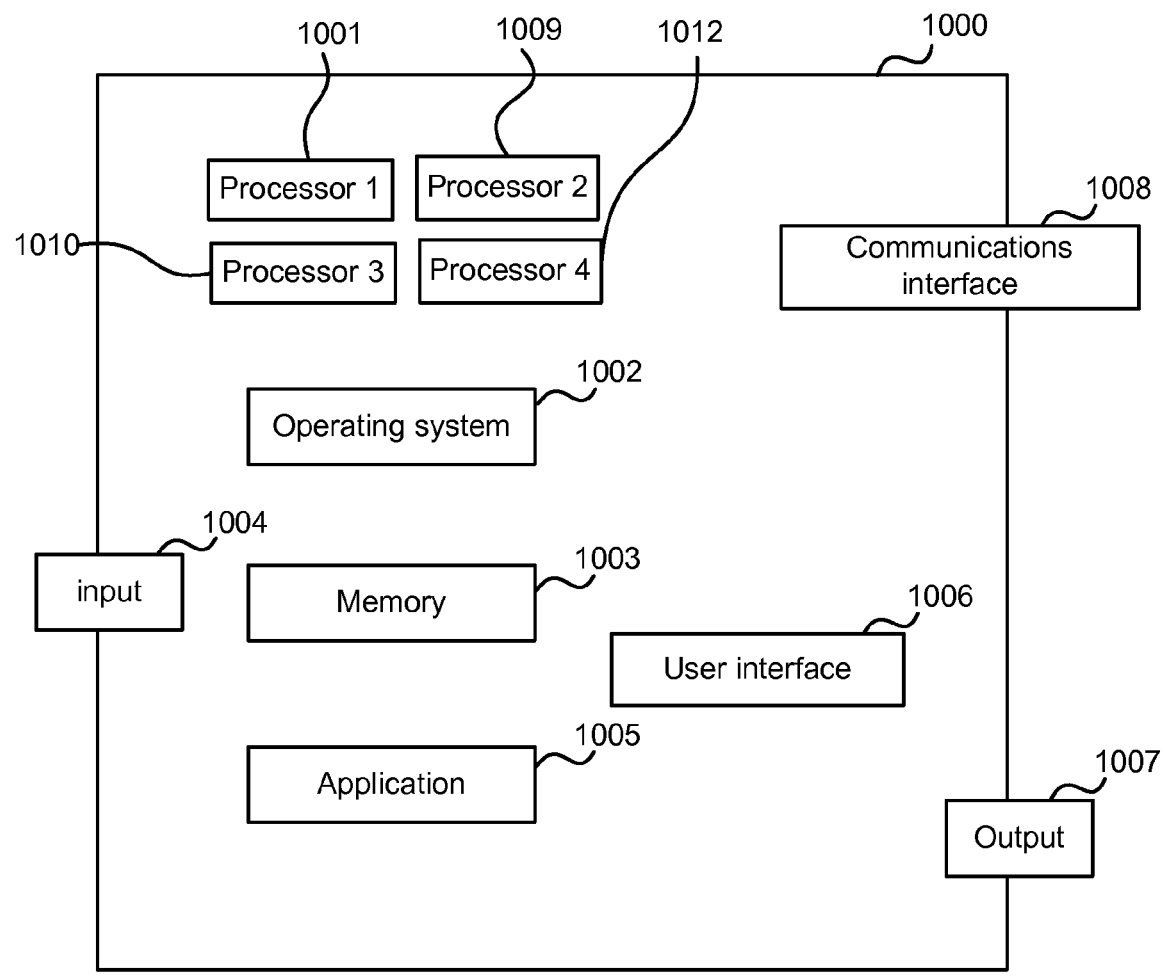
FIG. 8 illustrates an exemplary computing-based device in which embodiments of image processing may be implemented.

FIG. 8 illustrates various components of an exemplary computing-based device 1000 which may be implemented as any form of a computing and/or electronic device, and in which embodiments of the invention may be implemented.

The computing-based device 1000 comprises one or more inputs 1004 which are of any suitable type for receiving inputs such as an input from a digital camera or a digital camera video (which may include a web-cam). The device 1000 also comprises a communication interface 1008 for communicating with other entities such as communications network nodes.

Computing-based device 1000 also comprises one or more processors 1001, 1009, 1010, 1011 (the device 1000 of FIG. 8 has 4 processors but other examples may have a different number of processors) which may be microprocessors, controllers or any other suitable type of processors for processing computing executable instructions to control the operation of the device in order to carry out the functions required to process an image and/or a video sequence either separately or in parallel. Platform software comprising an operating system 1002 or any other suitable platform software may be provided at the computing-based device to enable application software 1005 to be executed on the device 1000.

The computer executable instructions may be provided using any computer-readable media, such as memory 1003. The memory is of any suitable type such as random information memory (RAM), a disk storage device of any type such as a magnetic or optical storage device, a hard disk drive, or a CD, DVD or other disc drive. Flash memory, EPROM or EEPROM may also be used.

An output 1007 may also be provided such as an audio and/or video output to a display system integral with or in communication with the computing-based device 1000, such as a Video Graphics Array. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. As has been described above, the software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for processing an image comprising:
receiving a user input identifying at least two objects within the image;
generating an input mask based on the received user input;
applying a geodesic filter to the input mask, the geodesic filter comprising an opening filtering operation that comprises a first erosion operation followed by a first dilation operation using a first structuring element and a closing filtering operation that comprises a second dilation operation followed by a second erosion operation using a second structuring element; and
generating an output mask, the generated output mask being the same regardless of an order of applying the opening filtering operation and the closing filtering operation to the input mask.

2. A method according to claim 1, wherein the first structuring element and the second structuring element are chosen from a same restricted sub area of the image.

3. A method according to claim 1, further comprising requesting a new user input to specify the first structuring element and the second structuring element.

4. A method according to claim 1, further comprising performing segmentation of the image.

5. A method according to claim 4, further comprising rejecting the segmentation of the image if predetermined criteria are not met.

6. A method according to claim 1, further comprising performing on the image at least one of segmentation, denoising, texture smoothing, cartooning and stitching.

7. A method according to claim 1, wherein applying a geodesic filter further comprises applying global energy constraints.

8. A method according to claim 1, wherein the image is an n-dimensional image wherein n is greater than or equal to 2.

9. A method according to claim 1, wherein the image is a frame of a video and the method further comprises repeating receiving a user input, generating an input mask, applying a geodesic filter and generating an output mask on at least one other frame of the video.

10. A storage device configured with device-executable instructions that, when executed by one or more processors, configure the one or more processors to perform acts comprising:
applying a geodesic filter to an input image mask associated with an input image to generate an output mask, the geodesic filter comprising a distance-based and symmetrical filter allowing a symmetrical mixing of a closing filtering operation and an opening filtering operation; and
using the output mask to perform at least one of image segmentation, denoising, cartooning, texture smoothing, and stitching.

11. A storage device according to claim 10, wherein applying the geodesic filter comprises applying an erosion operation with an erosion structuring element and a dilation operation with a dilation structuring element.

12. A storage device according to claim 11, wherein the erosion structuring element and the dilation structuring element are chosen from a same restricted sub area of the input image.

13. A storage device according to claim 11, further comprising requesting user input to specify the erosion structuring element and the dilation structuring element.

14. A storage device according to claim 10, wherein applying the geodesic filter comprises applying a filter with an image gradient factor.

15. A storage device according to claim 10, further comprising determining criteria relating to the quality of the output mask and rejecting the output mask if predetermined criteria are not met.

16. A system comprising:
one or more processors;
memory, communicatively coupled to the one or more processors, storing instructions that, when executed by the one or more processors, configure the one or more processors to perform acts comprising:
receiving a user input identifying an object in an input image;

generating an input mask based on the received user input;
applying a geodesic filter to the input mask, the geodesic filter comprising an opening filtering operation and a closing filtering operation, the geodesic filter producing a same result from the input mask regardless of an order of applying the opening operation and the closing filtering operation to the input mask; and
generating an output mask based on the applying.

17. The system according to claim 16, wherein the opening filtering operation comprises an erosion operation followed by a dilation operation using a same structuring element.

18. The system according to claim 16, wherein the closing filtering operation comprises a dilation operation followed by an erosion operation using a same structuring element.

19. The system according to claim 16, wherein the geodesic filter further comprises a global constraint on at least one of an area, a global appearance, a shape and context of an object in the input image.

20. The system according to claim 16, wherein the geodesic filter further comprises an image gradient factor.

* * * * *